US010593330B2

(12) United States Patent
Sharifi

(10) Patent No.: US 10,593,330 B2
(45) Date of Patent: *Mar. 17, 2020

(54) HOTWORD DETECTION ON MULTIPLE DEVICES

(71) Applicant: Google LLC, Mountain View, CA (US)

(72) Inventor: Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,495

(22) Filed: Oct. 26, 2018

(65) Prior Publication Data

US 2019/0130914 A1 May 2, 2019

Related U.S. Application Data

(63) Continuation of application No. 15/346,914, filed on Nov. 9, 2016, now Pat. No. 10,134,398, which is a
(Continued)

(51) Int. Cl.
*G10L 15/28* (2013.01)
*G10L 15/22* (2006.01)
(Continued)

(52) U.S. Cl.
CPC ............ *G10L 15/285* (2013.01); *G10L 15/01* (2013.01); *G10L 15/08* (2013.01); *G10L 15/22* (2013.01);
(Continued)

(58) Field of Classification Search
CPC ......... G10L 15/22; G10L 15/30; G10L 25/78; G10L 15/08; G10L 2015/223;
(Continued)

(56) References Cited

U.S. PATENT DOCUMENTS

| 4,363,102 A | 12/1982 | Holmgren |
| 5,659,665 A * | 8/1997 | Whelpley, Jr. ............ G06F 3/16 704/248 |

(Continued)

FOREIGN PATENT DOCUMENTS

| JP | 2000-75954 | 3/1920 |
| JP | S59-180599 | 10/1984 |

(Continued)

OTHER PUBLICATIONS

Auckenthaler et al. "Score Normalization for Text-independent Speaker Verification System," Digital Signal Processing, vol. 10, 2000, 13 pages.

(Continued)

*Primary Examiner* — Michael Colucci
(74) *Attorney, Agent, or Firm* — Honigman LLP

(57) ABSTRACT

Methods, systems, and apparatus, including computer programs encoded on a computer storage medium, for hotword detection on multiple devices are disclosed. In one aspect, a method includes the actions of receiving, by a first computing device, audio data that corresponds to an utterance. The actions further include determining a first value corresponding to a likelihood that the utterance includes a hotword. The actions further include receiving a second value corresponding to a likelihood that the utterance includes the hotword, the second value being determined by a second computing device. The actions further include comparing the first value and the second value. The actions further include based on comparing the first value to the second value, initiating speech recognition processing on the audio data.

18 Claims, 3 Drawing Sheets

Related U.S. Application Data continuation of application No. 15/088,477, filed on Apr. 1, 2016, now Pat. No. 9,514,752, which is a continuation of application No. 14/675,932, filed on Apr. 1, 2015, now Pat. No. 9,318,107.

(60) Provisional application No. 62/061,830, filed on Oct. 9, 2014.

(51) Int. Cl.
| | |
|---|---|
| *G10L 15/08* | (2006.01) |
| *G10L 17/22* | (2013.01) |
| *G10L 15/32* | (2013.01) |
| *G10L 15/01* | (2013.01) |
| *G06F 3/16* | (2006.01) |

(52) U.S. Cl.
CPC .............. *G10L 15/32* (2013.01); *G10L 17/22* (2013.01); *G06F 3/167* (2013.01); *G10L 2015/088* (2013.01); *G10L 2015/223* (2013.01)

(58) Field of Classification Search
CPC ......... G10L 25/93; G10L 15/00; G10L 15/34; G06F 1/3215; G06F 2203/0381; H04R 3/005
USPC ....... 704/254, 275, 273, 270, 257, 256, 251, 704/250, 247, 246, 244, 243, 235, 233, 704/231, 228, 224, 2; 455/414.1; 434/157; 391/71.1; 379/88.03, 88.01; 367/124
See application file for complete search history.

(56) References Cited

U.S. PATENT DOCUMENTS

| | | | |
|---|---|---|---|
| 5,897,616 A | 4/1999 | Kanersky | |
| 6,023,676 A | 2/2000 | Erell | |
| 6,141,644 A | 10/2000 | Kuhn | |
| 6,567,775 B1 | 5/2003 | Maali | |
| 6,671,672 B1* | 12/2003 | Heck | G10L 17/24 704/273 |
| 6,744,860 B1* | 6/2004 | Schrage | H04M 1/271 379/207.02 |
| 6,826,159 B1 | 11/2004 | Shaffer | |
| 6,931,375 B1 | 8/2005 | Bossemeyer | |
| 6,973,426 B1 | 12/2005 | Schier | |
| 7,016,833 B2 | 3/2006 | Gable | |
| 7,222,072 B2* | 5/2007 | Chang | G10L 17/22 704/249 |
| 7,571,014 B1 | 8/2009 | Lambourne et al. | |
| 7,720,012 B1 | 5/2010 | Borah | |
| 7,904,297 B2* | 3/2011 | Mirkovic | G06F 17/28 704/235 |
| 8,099,288 B2 | 1/2012 | Zhang | |
| 8,200,488 B2 | 6/2012 | Kemp et al. | |
| 8,209,174 B2 | 6/2012 | Al-Telmissani | |
| 8,214,447 B2 | 7/2012 | Deslippe et al. | |
| 8,340,975 B1* | 12/2012 | Rosenberger | G10L 15/22 704/270 |
| 8,588,949 B2 | 11/2013 | Lambourne et al. | |
| 8,670,985 B2 | 3/2014 | Lindahl et al. | |
| 8,713,119 B2 | 4/2014 | Lindahl | |
| 8,717,949 B2 | 5/2014 | Crinon | |
| 8,719,009 B2 | 5/2014 | Baldwin et al. | |
| 8,719,018 B2 | 5/2014 | Dinerstein | |
| 8,768,687 B1* | 7/2014 | Quasthoff | G10L 15/26 379/142.14 |
| 8,775,191 B1 | 7/2014 | Sharifi et al. | |
| 8,805,890 B2 | 8/2014 | Zhang et al. | |
| 8,838,457 B2 | 9/2014 | Cerra et al. | |
| 8,938,394 B1 | 1/2015 | Faaborg et al. | |
| 8,996,372 B1* | 3/2015 | Secker-Walker | G10L 15/34 704/231 |
| 9,142,218 B2* | 9/2015 | Schroeter | G10L 17/20 |
| 2002/0049596 A1* | 4/2002 | Burchard | G10L 15/22 704/270 |
| 2002/0072905 A1* | 6/2002 | White | G10L 15/30 704/231 |
| 2002/0123890 A1* | 9/2002 | Kopp | H04L 12/6418 704/233 |
| 2002/0193991 A1* | 12/2002 | Bennett | G10L 15/08 704/247 |
| 2003/0200090 A1* | 10/2003 | Kawazoe | G10L 15/00 704/251 |
| 2003/0220797 A1 | 11/2003 | Ito | |
| 2003/0231746 A1 | 12/2003 | Hunter | |
| 2004/0101112 A1* | 5/2004 | Kuo | H04M 1/271 379/88.01 |
| 2005/0165607 A1* | 7/2005 | Di Fabbrizio | G06F 17/2785 704/256 |
| 2006/0074656 A1* | 4/2006 | Mathias | G10L 15/063 704/243 |
| 2006/0085188 A1 | 4/2006 | Goodwin et al. | |
| 2006/0184370 A1* | 8/2006 | Kwak | G10L 15/1822 704/275 |
| 2007/0100620 A1* | 5/2007 | Tavares | G10L 17/06 704/246 |
| 2007/0198262 A1 | 8/2007 | Mindlin | |
| 2009/0240488 A1 | 9/2009 | White | |
| 2009/0258333 A1* | 10/2009 | Yu | G09B 5/04 434/157 |
| 2009/0292541 A1* | 11/2009 | Daya | G10L 15/063 704/251 |
| 2010/0070276 A1* | 3/2010 | Wasserblat | G10L 15/18 704/243 |
| 2010/0110834 A1* | 5/2010 | Kim | G01S 3/8083 367/124 |
| 2011/0026722 A1* | 2/2011 | Jing | G10L 21/0208 381/71.1 |
| 2011/0054892 A1* | 3/2011 | Jung | G10L 15/08 704/233 |
| 2011/0060587 A1* | 3/2011 | Phillips | G10L 15/30 704/235 |
| 2011/0066429 A1* | 3/2011 | Shperling | G10L 25/78 704/228 |
| 2011/0184730 A1 | 7/2011 | LeBeau et al. | |
| 2011/0304648 A1 | 12/2011 | Kim et al. | |
| 2012/0084087 A1 | 4/2012 | Yang | |
| 2012/0136923 A1 | 5/2012 | Grube | |
| 2012/0232896 A1* | 9/2012 | Taleb | G10L 25/78 704/233 |
| 2012/0245941 A1 | 9/2012 | Cheyer | |
| 2012/0265528 A1* | 10/2012 | Gruber | G10L 15/18 704/235 |
| 2013/0060571 A1* | 3/2013 | Soemo | G10L 15/30 704/251 |
| 2013/0124207 A1 | 5/2013 | Sarin et al. | |
| 2013/0132086 A1* | 5/2013 | Xu | G10L 15/01 704/257 |
| 2013/0183944 A1* | 7/2013 | Mozer | H04L 12/282 455/414.1 |
| 2013/0289996 A1* | 10/2013 | Fry | G10L 15/32 704/257 |
| 2014/0006825 A1 | 1/2014 | Shenhav | |
| 2014/0012573 A1* | 1/2014 | Hung | G06F 1/3215 704/233 |
| 2014/0012578 A1 | 1/2014 | Morioka | |
| 2014/0088961 A1* | 3/2014 | Woodward | G10L 15/22 704/235 |
| 2014/0163978 A1 | 6/2014 | Basye | |
| 2014/0222430 A1* | 8/2014 | Rao | G10L 15/04 704/254 |
| 2014/0257821 A1* | 9/2014 | Adams | G10L 25/93 704/275 |
| 2014/0278383 A1* | 9/2014 | Fan | G10L 25/84 704/224 |
| 2014/0278435 A1* | 9/2014 | Ganong, III | G10L 15/22 704/275 |
| 2015/0081295 A1 | 3/2015 | Yun | |

(56) References Cited

U.S. PATENT DOCUMENTS

| | | | |
|---|---|---|---|
| 2015/0154953 A1* | 6/2015 | Bapat | G10L 15/06 704/251 |
| 2015/0228274 A1 | 8/2015 | Leppanen | |
| 2015/0262577 A1* | 9/2015 | Nomura | G10L 15/22 704/231 |
| 2015/0379989 A1 | 12/2015 | Balasubramanian | |
| 2016/0104483 A1 | 4/2016 | Foerster et al. | |
| 2016/0155443 A1 | 6/2016 | Khan | |
| 2016/0189715 A1 | 6/2016 | Nishikawa | |
| 2016/0217790 A1 | 7/2016 | Sharifi | |
| 2016/0260431 A1 | 9/2016 | Newendorp | |

FOREIGN PATENT DOCUMENTS

| | | |
|---|---|---|
| JP | H09-62293 | 3/1997 |
| JP | H09-127973 | 5/1997 |
| JP | H11-52976 | 2/1999 |
| JP | H11-231896 | 8/1999 |
| JP | 2000-310999 | 11/2000 |
| JP | 2006-227634 | 8/2006 |
| JP | 2009-104020 | 5/2009 |
| JP | 2014-92777 | 5/2014 |
| JP | 2015520409 | 7/2015 |
| KR | 10-2014-0031391 | 3/2014 |
| WO | WO1998040875 | 9/1998 |
| WO | WO2015/006385 | 1/2013 |
| WO | WO2013/163113 | 10/2013 |
| WO | WO2014/008194 | 1/2014 |
| WO | WO2014/130463 | 8/2014 |
| WO | WO2015/025330 | 2/2015 |

OTHER PUBLICATIONS

European Examination Report issued in European Application No. 16207288.8-1210, dated Aug. 1, 2018, 5 pages.
European Office Action issued in Application No. 15781811.3, dated Aug. 23, 2017, 6 pages.
Extended European Search Report in European Application No. 16207288.8-1914, dated Apr. 4, 2017, 8 pages.
Extended European Search Report issued in Application No. 16195834.3-1910, dated Nov. 23, 2016, 9 pages.
International Preliminary Report of Patentability in International application No. PCT/US2015/030569, dated Jan. 24, 2017, 8 pages.
International Preliminary Report on Patentability in International Application No. PCT/US2015/052860, dated Apr. 11, 2017, 9 pages.
International Search Report and Written Opinion in International Application No. PCT/US2015/052860, dated Dec. 8, 2015, 12 pages.
International Search Report and Written Opinion issued in International Application No. PCT/US2017/045123, dated Nov. 8, 2017, 15 pages.
Jae-Seung, Choi, "Text-dependent Speaker Recognition using Characteristic Vectors in Speech Signal and Normalized Recognition Method," Journal of Korean Institute of Information Technology, 10(5), May 2012 (English Abstract).
Japanese Office Action issued in Application No. 2016-250670, dated Mar. 26, 2018, 7 pages (English Translation).
Japanese Office Action issued in Application No. 2016-561322, dated Feb. 5, 2018, 6 pages (with English Translation).
Japanese Office Action issued in Japanese Application No. 2017-170185, dated Oct. 1, 2018, 17 pages (with English Abstract).
Korean Office Action issued in Application No. 10-2016-7027999, dated Aug. 28, 2017, 9 pages (with English Translation).
Korean Office Action issued in Application No. 10-2016-7033161, dated Dec. 19, 2017, 10 pages (with English Translation).
Notice of Allowance in Japanese Application No. 2016-551250, dated Aug. 7, 2017, 3 pages (English Translation).
Notice of Allowance in Korean Application No. 10-2016-7021778, dated Apr. 25, 2017, (no English translation yet).
Notice of Allowance in U.S. Appl. No. 15/201,972, dated Jun. 1, 2017, 10 pages.
Notice of Allowance issued in U.S. Appl. No. 15/278,269, dated Jan. 12, 2018, 10 pages.
Office Action in Japanese Application No. 2016-551250, dated Apr. 10, 2017, 6 pages (English Translation).
Office Action in Korean Application No. 10-2016-7021778, dated Dec. 13, 2016, 4 pages.
Office Action issued in Korean Application No. 10-2016-7022701, dated Aug. 17, 2017, 4 pages (English Translation).
Office Action issued in Korean Application No. 10-2016-7027999, dated Apr. 12, 2017, 9 pages (English Translation).
Office Action issued in U.S. Appl. No. 15/278,269, dated Aug. 18, 2017, 23 pages.

* cited by examiner

HOTWORD DETECTION ON MULTIPLE DEVICES

CROSS-REFERENCE TO RELATED APPLICATION

This application is a continuation of U.S. application Ser. No. 15/346,914, filed Nov. 9, 2016, which is a continuation of U.S. application Ser. No. 15/088,477, filed Apr. 1, 2016, which is a continuation of U.S. application Ser. No. 14/675,932, filed Apr. 1, 2015, which claims the benefit of U.S. Provisional Application No. 62/061,830, filed on Oct. 9, 2014, all of which are incorporated by reference.

TECHNICAL FIELD

This specification generally relates to systems and techniques for recognizing the words that a person is speaking, otherwise referred to as speech recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

SUMMARY

For a speech-enabled system, the users' manner of interacting with the system is designed to be primarily, if not exclusively, by means of voice input. Consequently, the system, which potentially picks up all utterances made in the surrounding environment including those not directed to the system, must have some way of discerning when any given utterance is directed at the system as opposed, e.g., to being directed at an individual present in the environment. One way to accomplish this is to use a hotword, which by agreement among the users in the environment, is reserved as a predetermined word that is spoken to invoke the attention of the system. In an example environment, the hotword used to invoke the system's attention are the words "OK computer." Consequently, each time the words "OK computer" are spoken, it is picked up by a microphone, conveyed to the system, which performs speech recognition techniques to determine whether the hotword was spoken and, if so, awaits an ensuing command or query. Accordingly, utterances directed at the system take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

According to one innovative aspect of the subject matter described in this specification, a user device receives an utterance that is spoken by a user. The user device determines whether the utterance includes a hotword and computes a hotword confidence score that indicates a likelihood that the utterance includes the hotword. The user device transmits this score to other user devices in the near vicinity. The other user devices likely received the same utterance. The other user devices compute a hotword confidence score and transmit their scores to the user device. The user device compares the hotword confidence scores. If the user device has the highest hotword confidence score, then the user device remains active and prepares to process additional audio. If the user device does not have the highest hotword confidence score, then the user device does not process the additional audio.

In general, another innovative aspect of the subject matter described in this specification may be embodied in methods that include the actions of receiving, by a first computing device, audio data that corresponds to an utterance; determining a first value corresponding to a likelihood that the utterance includes a hotword; receiving a second value corresponding to a likelihood that the utterance includes the hotword, the second value being determined by a second computing device; comparing the first value and the second value; and based on comparing the first value to the second value, initiating speech recognition processing on the audio data.

These and other embodiments can each optionally include one or more of the following features. The actions further include determining that the first value satisfies a hotword score threshold. The actions further include transmitting the first value to the second computing device. The actions further include determining an activation state of the first computing device based on comparing the first value and the second value. The action of determining an activation state of the first computing device based on comparing the first value and the second value further includes determining that the activation state is an active state. The actions further include receiving, by the first computing device, additional audio data that corresponds to an additional utterance; determining a third value corresponding to a likelihood that the additional utterance includes the hotword; receiving a fourth value corresponding to a likelihood that the utterance includes the hotword, the fourth value being determined by a third computing device; comparing the first value and the second value; and based on comparing the first value and the second value, determining that the activation state of the first computing device is an inactive state.

The action of transmitting the first value to the second computing device further includes transmitting, to a server, through a local network, or through a short range radio, the first value. The action of receiving a second value corresponding to a likelihood that the utterance includes the hotword, the second value being determined by a second computing device further includes receiving, from the server, through the local network, or through the short range radio, a second value that was determined by a second computing device. The actions further include identifying the second computing device; and determining that the second computing device is configured to respond to utterances that include the hotword. The action of transmitting the first value to the second computing device further includes transmitting a first identifier for the first computing device. The action of receiving a second value corresponding to a likelihood that the utterance includes the hotword, the second value being determined by a second computing device further includes receiving a second identifier for the second computing device. The action of determining that the activation state is an active state further includes determining that a particular amount of time has elapsed since receiving the audio data that corresponds to the utterance. The actions further include continuing, for a particular amount of time, to transmit the first value based on determining that the activation state is an active state.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. Multiple devices can detect a hotword and only one device will respond to the hotword.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In the not too distant future, it is possible that many devices may be continuously listening for hotwords. When a single user has multiple devices trained to respond to their voice (e.g., a phone, tablet, TV, etc), it may be desirable to suppress responding to hotwords on devices that are not likely to be the ones a user intends to address. For example, when a user speaks the hotword toward one device, if any of their other devices are nearby, it is likely that they will also trigger a voice search. In many cases, this is not the user's intention. Thus, it may be advantageous if only a single device should trigger, specifically the device the user is speaking to. The present specification addresses the problem of selecting the correct device for reacting to a hotword, and suppressing reaction to the hotword on other devices.

Figure 1:
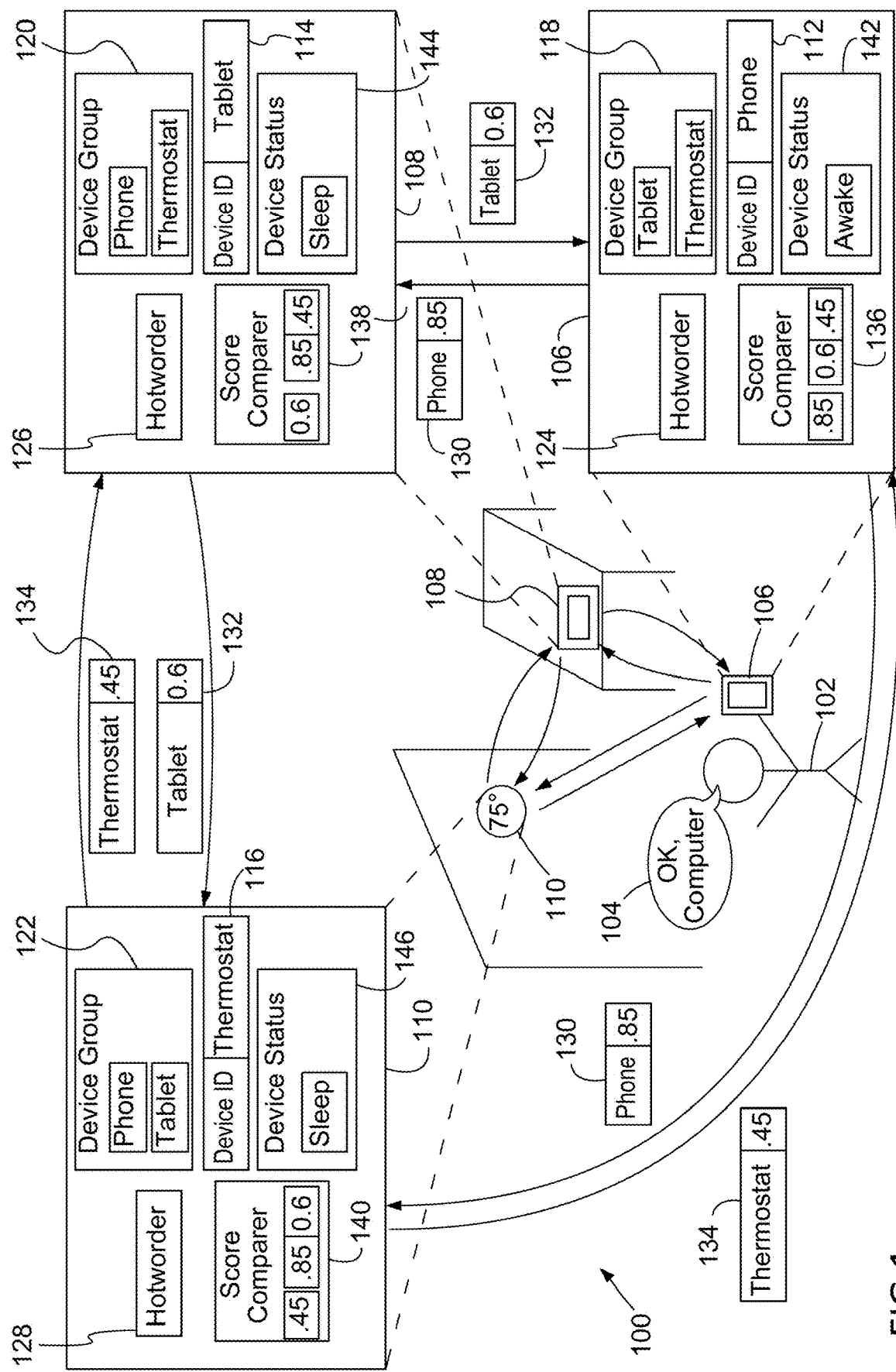
FIG. 1 is a diagram of an example system for hotword detection.

FIG. 1 is a diagram of an example system 100 for hotword detection. In general, system 100 illustrates a user 102 speaking an utterance 104 that is detected by microphones of computing devices 106, 108, and 110. The computing devices 106, 108, and 110 process the utterance 104 to determine a likelihood that the utterance 104 includes a hotword. The computing devices 106, 108, and 110 each transmit data to each other that indicates the likelihood that the utterance 104 includes a hotword. The computing devices 106, 108, and 110 each compare the data, and the computing device that computed the highest likelihood that the utterance 104 included a hotword initiates speech recognition on the utterance 104. The computing devices that did not compute the highest likelihood that the utterance 104 includes a hotword do not initiate speech recognition on the speech following the utterance 104.

Before transmitting, to another computing device, data that indicates a likelihood that the utterance 104 corresponds to a hotword, the computing devices that are located near each other identify each other. In some implementations, the computing devices identify each other by searching the local network for other devices that are configured to respond to the hotword. For example, computing device 106 may search the local area network for other devices that are configured to respond to the hotword and identify computing device 108 and computing device 110.

In some implementations, the computing devices identify other nearby computing devices that are configured to respond to the hotword by identifying the user who is logged into each device. For example, user 102 is logged into computing devices 106, 108, and 110. The user 102 has the computing device 106 is the user's hand. The computing device 108 is sitting on the table, and the computing device 110 is located on a nearby wall. Computing device 106 detects computing devices 108 and 110 and each computing device shares information that is related to the user who is logged into the computing device, such as a user identifier. In some implementations, the computing devices may identify other near computing devices that are configured to respond to the hotword by identifying computing devices that are configured to respond when the hotword is spoken by the same user through speaker identification. For example, the user 102 configured the computing devices 106, 108, and 110 each to respond to the voice of user 102 when user 102 speaks the hotword. The computing devices share the speaker identification information by providing a user identifier for user 102 to each other computing device. In some implementations, the computing devices may identify other computing devices that are configured to respond to the hotword through short range radio. For example, the computing device 106 may transmit a signal through short range radio searching for other computing devices that are configured to respond to the hotword. The computing devices may employ one of these techniques or a combination of them to identify other computing devices that are configured to respond to the hotword.

Once the computing devices 106, 108, and 110 have identified other computing devices that are configured to respond to the hotword, the computing devices 106, 108, and 110 share and store device identifiers for the identified computing devices. The identifiers may be based on a type of device, an IP address of the device, a MAC address, a name given to the device by a user, or any similar unique identifier. For example, the device identifier 112 for computing device 106 may be "phone." The device identifier 114 for computing device 108 may be "tablet." The device identifier 116 for computing device 110 may be "thermostat." The computing devices 106, 108, and 110 store the device identifier for the other computing devices that are configured to respond to the hotword. Each computing device has a device group where the computing device stores the device identifiers. For example, computing device 106 has device group 118 that lists "tablet" and "thermostat" as the two devices that will receive the likelihood that the audio data includes the hotword as computed by the computing device 106. The computing device 108 has device group 120 that lists "phone" and "thermostat" as the two devices that will receive the likelihood that the audio data includes the hotword as computed by the computing device 108. The computing device 110 has device group 122 that lists "phone" and "tablet" as the two devices that will receive the likelihood that the audio data includes the hotword as computed by the computing device 110.

When the user 102 speaks the utterance 104, "OK computer," each computing device that has a microphone in the vicinity of the user 102 detects and processes the utterance 104. Each computing device detects the utterance 104 through an audio input device such as a microphone. Each microphone provides audio data to a respective audio subsystem. The respective audio subsystem buffers, filters, and digitizes the audio data. In some implementations, each computing device may also perform endpointing and speaker identification on the audio data. The audio subsystem provides the processed audio data to a hotworder. The hotworder compares the processed audio data to known hotword data and computes a confidence score that indicates the likelihood that the utterance 104 corresponds to a hotword. The hotworder may extract audio features from the processed audio data such as filterbank energies or mel-frequency cepstral coefficients. The hotworder may use classifying windows to process these audio features such as by using a support vector machine or a neural network. Based on the processing of the audio features, the hotworder 124 computes a confidence score of 0.85, hotworder 126 computes a confidence score of 0.6, and hotworder 128 computes a confidence score of 0.45. In some implementations, the confidence score may be normalized to a scale of zero to one, with a higher number indicating a greater confidence that the utterance 104 includes a hotword.

Each computing device transmits a respective confidence score data packet to the other computing devices in the device group. Each confidence score data packet includes a respective confidence score and the respective device identifier for the computing device. For example, the computing device 106 transmits the confidence score data packet 130 that includes the confidence score of 0.85 and the device identifier "phone" to computing devices in device group 118, computing devices 108 and 110. The computing device 108 transmits the confidence score data packet 132 that includes the confidence score of 0.6 and the device identifier "tablet" to computing devices in device group 120, computing devices 106 and 110. The computing device 110 transmits the confidence score data packet 134 that includes the confidence score of 0.45 and the device identifier "thermostat" to computing devices in device group 118, computing device 106 and 108.

In some implementations, a computing device may transmit the confidence score data packet if the confidence score satisfies a hotword score threshold. For example, if the hotword score threshold is 0.5, then the computing device 110 would not transmit the confidence score data packet 134 to the other computing devices in device group 122. The computing devices 106 and 108 would still transmit the confidence score data packets 130 and 132 to computing devices in device groups 118 and 120, respectively.

In some implementations, the computing device that transmit a confidence score data packet may transmit the confidence score data packet to other computing devices directly. For example, computing device 106 may transmit the confidence score data packet 130 to computing devices 108 and 110 through a short range radio. The communication protocol used between two computing devices may be universal plug and play. In some implementations, a computing device that transmits a confidence score data packet may broadcast the confidence score data packet. In this instance, the confidence score data packet may be received by the computing devices in the device group and by other computing devices. In some implementations, a computing device that transmits a confidence score data packet may transmit the confidence score data packet to a server and then the server transmits the confidence score data packet to the computing devices in the data group. The server may be located within the local area network of the computing devices or accessible through the Internet. For example, the computing device 108 sends the confidence score data packet 132 and the list of computing devices in device group 120 to a server. The server transmits the confidence score data packet 132 to computing device 106 and 110. In instances where a computing device that is transmitting the confidence score data packet to another computing device, the receiving computing device may send back a confirmation that the receiving computing device received the confidence score data packet.

Each computing device uses a score comparer to compare the hotword confidence scores that the computing device has received. For example, the computing device 106 computed a hotword confidence score of 0.85 and received hotword confidence scores of 0.6 and 0.45. In this instance, the score comparer 136 compares the three scores and identifies the score of 0.85 as the highest. For computing devices 108 and 110, the score comparers 138 and 140 reach similar conclusions, identifying the score of 0.85, which corresponds to computing device 106, as the highest.

The computing device that determines that its own hotword confidence score is the highest initiates speech recognition on speech data the follows the hotword utterance. For example, the user may speak "OK computer" and computing device 106 may determine that it has the highest hotword confidence score. The computing device 106 will initiate speech recognition on audio data received after the hotword. If the user speaks "call Alice," then the computing device 106 will process the utterance and execute the appropriate command. In some implementations, receiving a hotword may cause the computing devices that receive the hotword to activate from a sleep state. In this instance, the computing device with the highest hotword confidence score remains in an awake state while the other computing devices that do not have the highest hotword confidence score do not process speech data that follows the hotword utterance and enter a sleep state.

As illustrated in FIG. 1, the score comparer 136 identified the hotword confidence score corresponding to computing device 106 to be the highest. Therefore, the device status 142 is "awake." The score comparers 138 and 140 also identified the hotword confidence score corresponding to computing device 106 to be the highest. Therefore, the device statuses 138 and 140 are "asleep." In some implementations, the activation state of the computing device may be unaffected. For example, the user 102 may be watching a movie on the computing device 108 and have the computing device 106 in the user's hand. When the user 102 speaks "OK computer," the computing device 106, by virtue of having the highest hotword confidence score, initiates speech recognition on the audio data following the hotword. The computing device 108 does not initiate speech recognition on the audio data following the hotword, and continues to play the movie.

In some implementations, the computing device that determines that it has the highest hotword confidence score waits for a particular amount of time before beginning to perform speech recognition on speech following the hotword. Doing so allows a computing device that computed the highest hotword confidence score to begin performing speech recognition on speech that follows the hotword without waiting for a higher hotword confidence score. To illustrate, the score comparer 136 of computing device 106 received hotword confidence scores of 0.6 and 0.45 from computing device 108 and 110, respectively, as well as the hotword confidence score of 0.85 from the hotworder 124. From the time that the hotworder 124 computes a hotword confidence score of the "Ok computer" audio data, the computing device 106 waits five hundred milliseconds before performing speech recognition on speech that follows the hotword. In instances where the score comparer receives a higher score, the computing device may not wait for a particular amount of time before setting the device status to "sleep." For example, the hotworder 126 of computing device 108 computes a hotword confidence score of 0.6 and receives hotword confidence scores of 0.85 and 0.45. Once the computing device 108 receives the hotword confidence score of 0.85, then the computing device 108 can set the device status 144 to "sleep." This assumes that the computing device 108 receives the hotword confidence score of 0.85 within the particular amount of time after the hotworder 126 computes the hotword confidence score of 0.6.

In some implementations, when a computing device has the highest hotword confidence score, the computing device may continue to broadcast the confidence score data packet for a particular amount of time to ensure that other computing devices receive the confidence score data packet. This strategy would be most applicable in instances where a computing device does send back a confirmation once it receives a confidence score data packet from another computing device. Therefore, if the computing device 106 transmits the confidence score data packet 130 to computing devices in data group 118 and receives a confirmation before a particular amount of time such as five hundred milliseconds, then the computing device 106 may begin to perform speech recognition on speech following the hotword. In instances where computing devices broadcast their confidence score data packets and do not expect confirmation, the computing device may continue to broadcast their hotword confidence scores for a particular amount of time, such as five hundred milliseconds, or until the computing device receives a higher hotword confidence score, whichever comes first. For example, computing device 110 computes a hotword confidence score of 0.45 and begins to broadcast the confidence score data packet 134. After three hundred milliseconds, the computing device 110 receives confidence score data packet 130 and stops broadcasting the confidence score data packet 134 because the hotword confidence score of 0.85 from confidence score data packet 130 is higher than the hotword confidence score of forty five. As another broadcast example, computing device 106 computes a hotword confidence score of 0.45 and begins to broadcast the confidence score data packet 130. After five hundred milliseconds, the computing device 106 stops broadcasting confidence score data packet 130 and begins to perform speech recognition on speech following the hotword. The computing device 106 may receive the confidence score data packets 132 and 134 before five hundred milliseconds has elapsed, but because the hotword confidence scores in the confidence score data packets 132 and 134 are lower than 0.85, the computing device continues to wait until after the five hundred milliseconds has elapsed.

In some implementations, the computing device may begin to perform speech recognition on speech following the hotword until the computing device receives a higher hotword confidence score. The hotworder computes a hotword confidence score and if the hotword confidence score satisfies a threshold, then the computing device performs speech recognition on speech following the hotword. The computing device may perform the speech recognition without displaying any indication of the speech recognition to the user. This may be desirable because doing so gives the user the impression that the computing device is not active while also allowing the computing device to display results based on the speech recognition to the user quicker than if the computing device had waited until the computing device confirmed that it computed the highest hotword score. As an example, the computing device 106 computes a hotword confidence score of 0.85 and begins to perform speech recognition on speech following the hotword. The computing device 106 receives confidence score data packets 132 and 134 and determines that the hotword confidence score of 0.85 is the highest. The computing device 106 continues to perform speech recognition on speech following the hotword and presents the results to the user. For computing device 108, the hotworder 126 computes a hotword confidence score of 0.6 and the computing device 108 begins to perform speech recognition on speech following the hotword without displaying data to the user. Once the computing device 108 receives the confidence score data packet 130 that includes the hotword confidence of 0.85, the computing device stops performing speech recognition. No data is displayed to the user, and the user is likely under the impression that the computing device 108 has remained in a "sleep" state.

In some implementations, to avoid any latency after a hotword is spoken, scores could be reported from the hotworder before the end of the hotword, e.g. for a partial hotword. For example, as a user is speaking "Ok computer," a computing device could compute a partial hotword confidence score once the user has finished speaking "OK comp." The computing device can then share the partial hotword confidence score with other computing devices. The computing device with the highest partial hotword confidence score can continue to process the user's speech.

In some implementations, a computing device may emit an audible or inaudible sound, e.g., of a particular frequency or frequency pattern, when the computing device determines that a hotword confidence score satisfies a threshold. The sound would signal to other computing devices that the computing device will continue to process the audio data following the hotword. Other computing devices would receive this sound and cease processing of the audio data. For example, a user speaks "Ok computer." One of the computing devices computes a hotword confidence score that is greater than or equal to a threshold. Once the computing device determines that the hotword confidence score is greater than or equal two a threshold, the computing device emits a sound of eighteen kilohertz. The other computing devices in the vicinity of the user may also be computing a hotword confidence score and may be in the middle of computing a hotword confidence score when the other computing devices receive the sound. When the other computing devices receive the sound, the other computing devices cease processing of the user's speech. In some implementations, the computing device may encode the hotword confidence score in the audible or inaudible sound. For example, if the hotword confidence score is 0.5, then the computing device may generate an audible or inaudible sound that includes a frequency pattern that encodes the score of 0.5.

In some implementations, the computing devices may use different audio metrics to select a computing device to continue processing the user's speech. For example, the computing devices may use loudness to determine which computing device will continue to process the user's speech. The computing device that detects the loudest speech may continue to process the user's speech. As another example, the computing device that is currently in use or has an active display may notify the other computing devices that it will continue to processes the user's speech upon detecting a hotword.

In some implementations, each computing device that is in the vicinity of the user while the user is speaking receives the audio data and sends the audio data to a server to improve speech recognition. Each computing device can receive the audio data that corresponds to the user's speech. While only one computing device will appear to the user to be processing the user's speech, each computing device can transmit the audio data to a server. The server can then use the audio data that is received from each computing device to improve speech recognition because the server can compare different audio samples that correspond to the same utterance. For example, a user says "Ok computer, remind me to buy milk." Once the user finishes speaking "Ok computer," the nearby computing devices will have likely determined which computing device has the highest hotword confidence score and that computing device will process and respond "remind me to buy milk" as the user speaks those words. The other computing devices will also receive "remind me to buy milk." While the other computing device will not respond to the "remind me to buy milk" utterance, the other computing devices can send audio data corresponding to "remind me to buy milk" to a server. The computing devices responding to "remind me to buy milk" can also send its audio data to the server. The server can process the audio data to improve speech recognition because the server has different audio samples from different computing devices that correspond to the same "remind me to buy milk" utterance.

Figure 2:
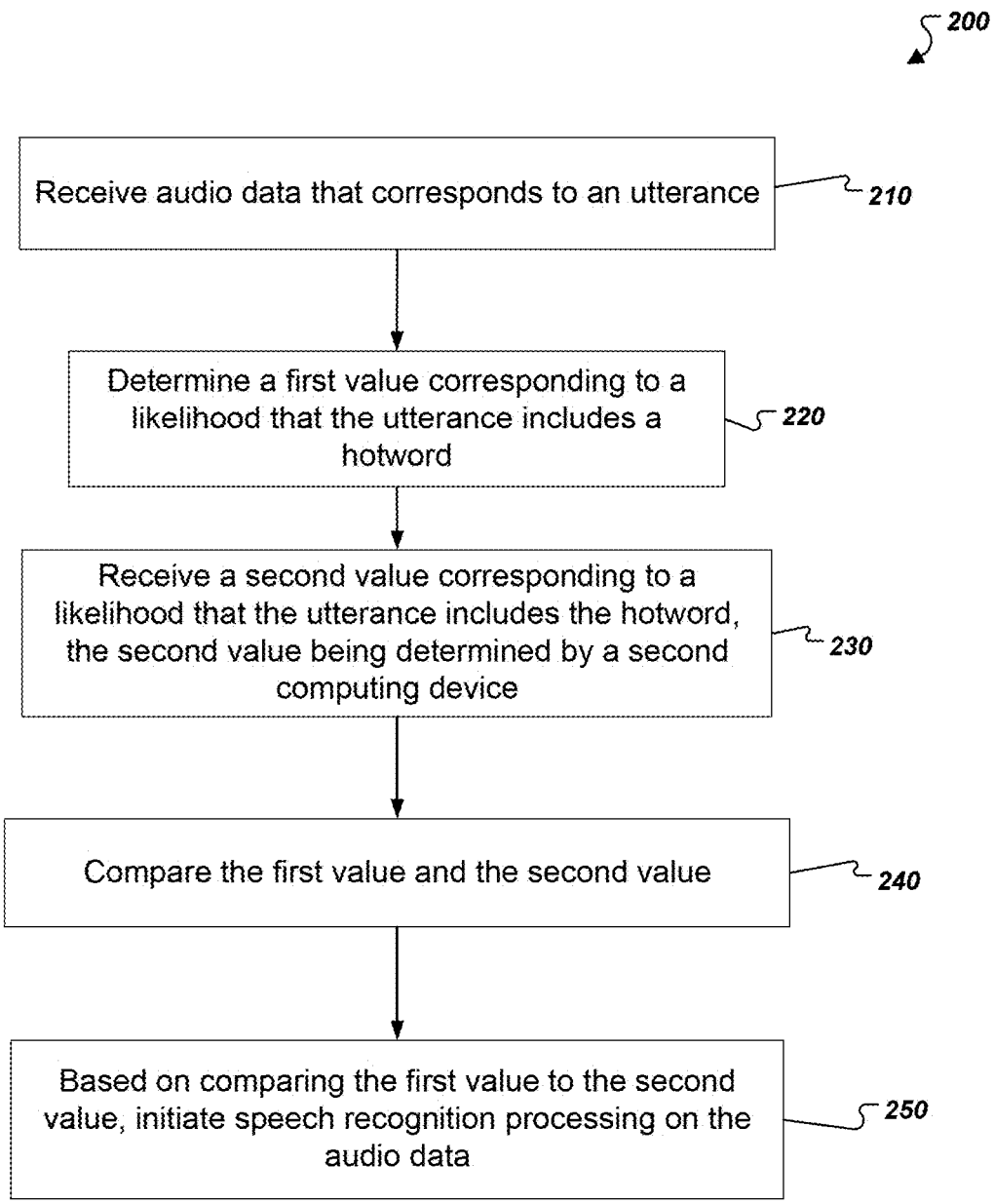
FIG. 2 is a diagram of an example process for hotword detection.

FIG. 2 is a diagram of an example process 200 for hotword detection. The process 200 may be performed by a computing device such as the computing device 108 from FIG. 1. The process 200 computes a value that corresponds a likelihood that an utterance includes a hotword and compares the value to other values computed by other computing devices to determine whether or not to perform speech recognition on the portion of the utterance after the hotword.

The computing device receives audio data that corresponds to an utterance (210). A user speaks the utterance and a microphone of the computing device receives the audio data of the utterance. The computing device processes the audio data by buffering, filtering, endpointing, and digitizing the audio data. As an example, the user may utter "Ok, computer" and the microphone of the computing device will receive the audio data that corresponds to "Ok, computer." An audio subsystem of the computing device will sample, buffer, filter, and endpoint the audio data for further processing by the computing device.

The computing device determines a first value corresponding to a likelihood that the utterance includes a hotword (220). The computing device determines the first value, which may be referred to as a hotword confidence score, by comparing the audio data of the utterance to a group of audio samples that include the hotword or by analyzing the audio characteristics of the audio data of the utterance. The first value may be normalized to a scale from zero to one where one indicates the highest likelihood that the utterance includes a hotword. In some implementations, the computing device identifies a second computing device and determines that the second computing device is configured to respond to utterances that include the hotword and is configured by the user to be responsive to the hotword. The user may be logged into both the computing device and the second computing device. Both the computing device and the second computing device may be configured to respond to the user's voice. The computing device and the second computing device may be connected to the same local area network. The computing device and the second computing device may both be located within a particular distance of each other, such as ten meters, as determined by GPS or signal strength. For example, the computing devices may communicate by a short range radio. The computing device may detect a strength of a signal being transmitted by the second computing device as five dBm and translate that a corresponding distance such as five meters.

The computing device receives a second value corresponding to a likelihood that the utterance includes the hotword, the second value being determined by a second computing device (230). The second computing device receives the utterance through a microphone of the second computing device. The second computing device processes the received audio data that corresponds to the utterance and determines a second value or a second hotword confidence score. The second hotword confidence score reflect the likelihood, as calculated by the second computing device, that the utterance includes a hotword. In some implementations, the computing device transmits the first value to the second computing device using one or more of the following techniques. The computing device may transmit the first value to the second computing device through a server accessible through the Internet, through a server that is located on the local area network, or directly through the local area network or a short range radio. The computing device may transmit the first value only to the second computing device or the computing device may broadcast the first value so that other computing devices may also receive the first value. The computing device may receive the second value from the second computing device using the same or different technique as the computing device transmitted the first value.

In some implementations, the computing device may compute a loudness score for the utterance or a signal to noise ratio for the utterance. The computing device may combine the loudness score, the signal to noise ratio, and the hotword confidence score to determine a new value for comparing to similar values from other computing devices. For example, the computing device may compute a hotword confidence score and a signal to noise ratio. The computing device may then combine those two scores and compare to similarly computed scores from other computing devices. In some implementations, the computing device may compute different scores and transmit each score to other computing devices for comparison. For example, the computing device may compute a loudness score for the utterance and a hotword confidence score. The computing device may then transmit those scores to other computing devices for comparison.

In some implementations, the computing device may transmit a first identifier with the first value. The identifier may be based on one or more of an address of the computing device, a name of the computing device given by the user, or a location of the computing device. For example, an identifier may be "69.123.132.43" or "phone." Similarly, the second computing device may transmit a second identifier with the second value. In some implementations, the computing device may transmit the first identifier to particular computing devices that the computing device previously identified as configured to respond to the hotword. For example, the computing device may have previously identified the second computing device as configured to respond to the hotword because, in addition to being able to respond to a hotword, the same user was logged into the second computing device as the computing device.

The computing device compares the first value and the second value (240). The computing device then initiates, based on the result of the comparison, speech recognition processing on the audio data (250). In some implementations, for example, the computing device initiates speech recognition when the first value is greater than or equal to the second value. If the user spoke "ok computer, call Carol," then the computing device would begin to process "call Carol" by performing speech recognition on "call Carol" because the first value is greater than or equal to second value. In some implementations, the computing device sets an activation state. In instances where the first value is greater than or equal to the second value, then the computing device sets the activation state as active or "awake." In the "awake" state, the computing device displays results from the speech recognition.

In some implementations, the computing device compares the first value and the second value and determines that the first value is less than the second value. The computing device, based on determining that the first value is less than the second value, sets the activation state as inactive or "sleep." In the "sleep" state, the computing device does not appear, to the user, to be active or processing the audio data.

In some implementations, when the computing device determines that the first value is greater than or equal to the second value, the computing device may wait for a particular amount of time before setting the activation state to active. The computing device may wait for the particular amount of time to increase the probability that the computing device will not receive a higher value from another computing device. The particular amount of time may be fixed or may vary depending on the technique that the computing devices transmit and receive values. In some implementations, when the computing device determines that the first value is greater than or equal to the second value, the computing device may continue to transmit the first value for a particular amount of time. By continuing to transmit the first value for a particular amount of time, the computing device increases the probability that the first value is received by the other computing devices. In instances where the computing device determines that the first value is less than the second value, the computing device may stop transmitting the first value.

In some implementations, the computing device may consider additional information in determining whether to execute the command following the hotword. One example of the additional information may be the portion of the utterance that follows the hotword. Typically, the audio data that follows the hotword corresponds to a command for the computing device such as "call Sally," "play Halloween Movie," or "set heat to 70 degrees." The computing device may identify a typical device that handles the type of request or that is capable of handling the request. A request to call a person would be typically handled by a phone based on pre-programmed typical usages or based on usage patterns of a user of the device. If the user typically watches movies on a tablet, then the tablet may handle a request to play a movie. If the thermostat is capable of adjusting the temperature, then the thermostat may handle temperature adjustments.

For the computing device to consider the portion of the utterance that follows the hotword, the computing device would have to initiate speech recognition on the audio data once it likely identifies a hotword. The computing device may categorize the command portion of the utterance and compute a frequency of commands in that category. The computing device may transmit the frequency along with the hotword confidence score to other computing devices. Each computing device may use the frequencies and the hotword confidence scores to determine whether to execute the command following the hotword.

For example, if the user utters "OK computer, play Michael Jackson," then if the computing device is a phone that the user use's twenty percent of the time to listen to music, then the computing device may transmit that information along with the hotword confidence score. A computing device such as a tablet that the user uses five percent of the time to listen to music may transmit that information along with the hotword confidence score to other computing devices. The computing devices may use a combination of the hotword confidence score and the percentage of time playing music to determine whether to execute the command.

Figure 3:
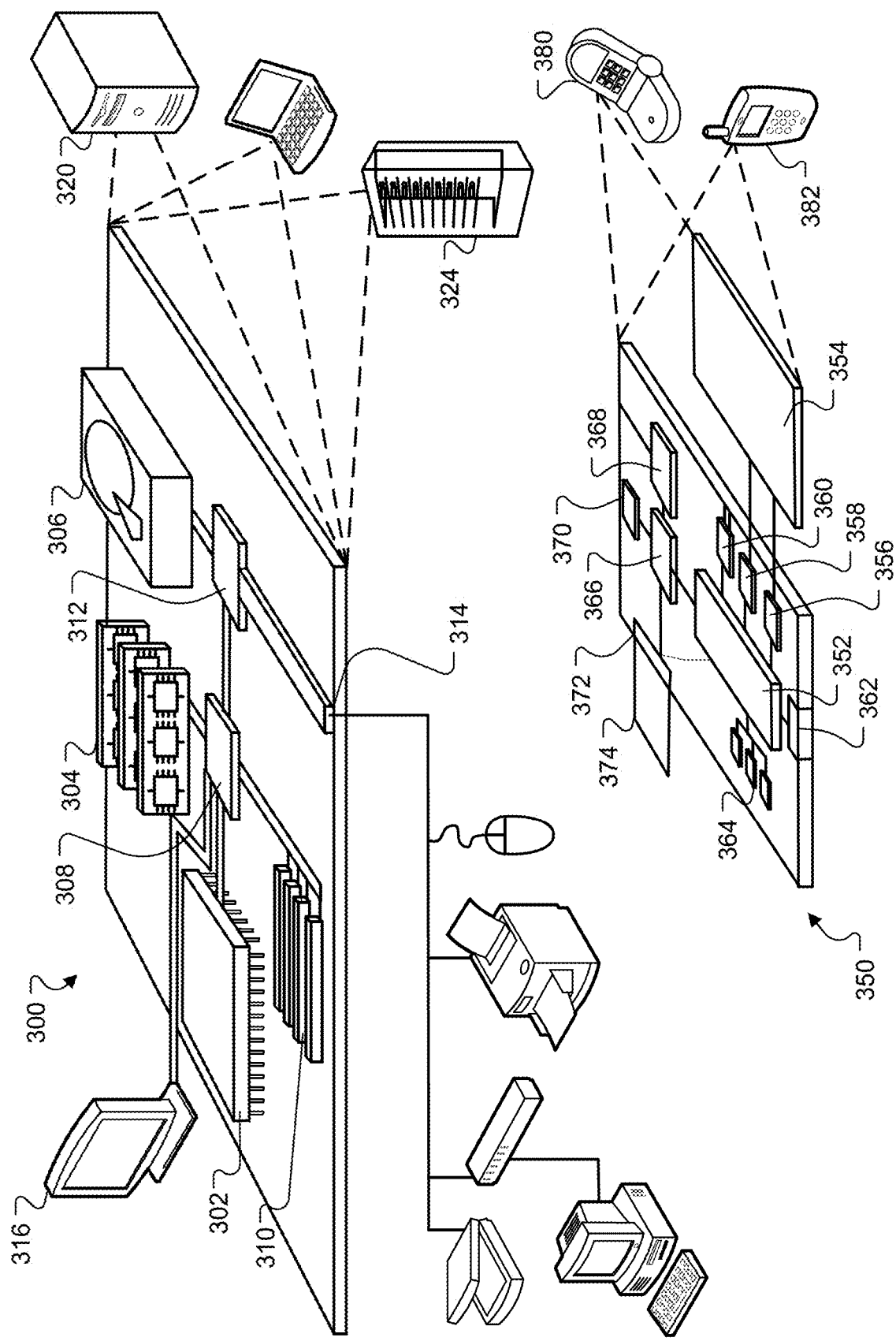
FIG. 3 shows an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middle-ware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by a computing device that is in a low power mode, audio data that includes an utterance of a particular, predefined hotword;
while the computing device remains in the low power mode, and in response to receiving the audio data that includes the utterance of the particular, predefined hotword, transmitting, by the computing device, a message;
while the computing device remains in the low power mode, receiving, by the computing device and from an additional computing device that is in a low power mode, an additional message; and
based on the message and the additional message, determining, by the computing device, to exit the low power mode.

2. The method of claim 1, comprising:
based on the message and the additional message, performing, by the computing device, automated speech recognition processing on the audio data.

3. The method of claim 1, wherein:
the computing device is configured to exit the low power mode in response to detecting an utterance of the particular, predefined hotword, and
the additional computing device is configured to exit the low power mode in response to detecting an utterance of the particular, predefined hotword.

4. The method of claim 1, comprising:
determining, by the computing device, that the audio data includes an utterance of a particular, predefined hotword without performing automated speech recognition processing on the audio data.

5. The method of claim 1, comprising:
determining, by the computing device, a hotword score that reflects a likelihood that the audio data includes an utterance of the particular, predefined hotword,
wherein the message includes the hotword score.

6. The method of claim 1, comprising:
determining, by the computing device, a hotword score that reflects a likelihood that the audio data includes an utterance of the particular, predefined hotword; and
determining, by the computing device, that the hotword score satisfies a threshold, wherein transmitting the message is based on determining that the hotword score satisfies the threshold.

7. The method of claim 1, comprising:
comparing, by the computing device, the message to the additional message;
determining to exit the low power mode based on comparing the message to the additional message.

8. The method of claim 1, wherein the first computing device transmits the message for a particular amount of time.

9. A system comprising:
one or more computers; and
one or more computers and one or more storage devices storing instructions that are operable, when executed by the one or more computers, to cause the one or more computers to perform operations comprising:
receiving, by a computing device that is in a low power mode, audio data that includes an utterance of a particular, predefined hotword;
while the computing device remains in the low power mode, and in response to receiving the audio data that includes the utterance of the particular, predefined hotword, transmitting, by the computing device, a message;
while the computing device remains in the low power mode, receiving, by the computing device and from an additional computing device that is in a low power mode, an additional message; and
based on the message and the additional message, determining, by the computing device, to exit the low power mode.

10. The system of claim 9, wherein the operations comprise:
based on the message and the additional message, performing, by the computing device, automated speech recognition processing on the audio data.

11. The system of claim 9, wherein:
the computing device is configured to exit the low power mode in response to detecting an utterance of the particular, predefined hotword, and
the additional computing device is configured to exit the low power mode in response to detecting an utterance of the particular, predefined hotword.

12. The system of claim 9, wherein the operations comprise:
determining, by the computing device, that the audio data includes an utterance of a particular, predefined hotword without performing automated speech recognition processing on the audio data.

13. The system of claim 9, wherein the operations comprise:
determining, by the computing device, a hotword score that reflects a likelihood that the audio data includes an utterance of the particular, predefined hotword,
wherein the message includes the hotword score.

14. The system of claim 9, wherein the operations comprise:
determining, by the computing device, a hotword score that reflects a likelihood that the audio data includes an utterance of the particular, predefined hotword; and
determining, by the computing device, that the hotword score satisfies a threshold,
wherein transmitting the message is based on determining that the hotword score satisfies the threshold.

15. The system of claim 9, wherein the operations comprise:
comparing, by the computing device, the message to the additional message;
determining to exit the low power mode based on comparing the message to the additional message.

16. The system of claim 9, wherein the first computing device transmits the message for a particular amount of time.

17. A non-transitory computer-readable medium storing software comprising instructions executable by one or more computers which, upon such execution, cause the one or more computers to perform operations comprising:
receiving, by a computing device that is in a low power mode, audio data that includes an utterance of a particular, predefined hotword;
while the computing device remains in the low power mode, and in response to receiving the audio data that includes the utterance of the particular, predefined hotword, transmitting, by the computing device, a message;
while the computing device remains in the low power mode, receiving, by the computing device and from an additional computing device that is in a low power mode, an additional message; and
based on the message and the additional message, determining, by the computing device, to exit the low power mode.

18. The medium of claim 17, wherein the operations comprise:
based on the message and the additional message, performing, by the computing device, automated speech recognition processing on the audio data.

* * * * *